United States Patent [19]
Takahashi et al.

[11] Patent Number: 6,163,440
[45] Date of Patent: Dec. 19, 2000

[54] INERTIAL LATCH MECHANISM FOR ACTUATOR OF DISK DRIVE DEVICE

[75] Inventors: Kohji Takahashi, Sagamihara; Keishi Takahashi, Fujisawa, both of Japan; Vijayeshwar D. Khanna, Ossining, N.Y.; Thomas R. Albrecht, San Jose, Calif.; Suresh Kumar, New Delhi, India; Muthuthamby Sri-Jayantha, Ossining, N.Y.

[73] Assignee: International Business Machines Corporation, Armonk, N.Y.

[21] Appl. No.: 09/069,033

[22] Filed: Apr. 27, 1998

[30] Foreign Application Priority Data

Apr. 30, 1997 [JP] Japan ................................... 9-112777

[51] Int. Cl.⁷ ............................... G11B 5/54; G11B 21/22
[52] U.S. Cl. ........................................................... 360/256.4
[58] Field of Search ..................... 360/105, 106, 360/256, 256.4, 256.5

[56] References Cited

U.S. PATENT DOCUMENTS

| | | | |
|---|---|---|---|
| 5,404,257 | 4/1995 | Alt | 360/105 |
| 5,668,683 | 9/1997 | Stone | 360/105 |
| 5,715,118 | 2/1998 | Tacklind | 360/105 |
| 5,717,544 | 2/1998 | Michael | 360/105 X |
| 5,859,751 | 1/1999 | Tacklind | 360/105 |
| 5,875,075 | 2/1999 | Hickox | 360/105 |

*Primary Examiner*—William R. Korzuch
*Attorney, Agent, or Firm*—Robert B. Martin

[57] ABSTRACT

The present invention relates to an inertial latch mechanism of an actuator of a thin disk drive device. An inertial latch mechanism comprises a latch lever rotatable on a pivot from a release position to a latch position, and an inertial lever which is rotatable on a pivot and has a moment of inertia larger than that of the latch lever. The inertial lever rotates counterclockwise when a counterclockwise shock is given to the actuator, and pulls the latch lever at a first latch part by a first latch projection to move the latch lever to the latch position. The inertial lever also rotates clockwise when a clockwise shock is given to the actuator, and pushes the latch lever at a second latch part by a second latch projection to latch the actuator which has bumped against a crash stop and is reversely rotating.

3 Claims, 15 Drawing Sheets

INERTIAL LATCH MECHANISM FOR ACTUATOR OF DISK DRIVE DEVICE

BACKGROUND OF THE INVENTION

1. Field of the Invention

The present invention relates to an inertial latch mechanism for latching the actuator in a disk drive device when an external shock is given to the disk drive device, to an actuator lock mechanism having the inertial latch mechanism and holding the actuator at a rest position when the disk drive device is inoperative, to a disk drive device having such actuator lock mechanism, and particularly to a highly reliable inertial latch mechanism which can latch the actuator regardless of the direction in which said shock causes the actuator to rotate.

2. Description of the Related Art

In the current disk drive device, particularly in the portable personal computer such as the notebook-sized personal computer, high reliability for a shock when it is inoperative is demanded. If the head slider mounted on the actuator is moved from the rest position to the data region of the disk surface by the shock when the disk drive device is not operating, the head slider sticks to the data region surface or scratches the data region surface, which leads to a fatal failure. There is an actuator lock mechanism for holding the actuator at the rest position when the disk drive is inoperative, thereby to prevent the actuator from being rotated by a shock and moving to the data region surface.

In the recent disk drive device, the load/unload mechanism of the head slider is considered for preventing the head slider from sticking to the surface of the refuge area or increasing the reliability for the above shock. The load/unload mechanism causes the head slider to refuge without contacting with the disk surface by holding the actuator in a ramp provided in the vicinity of the outer periphery of the disk when the disk drive device is not operating.

There is an actuator lock mechanism using an inertial latch mechanism. In the actuator lock mechanism using the inertial latch mechanism, usually the ramp of the above load/unload mechanism, a magnetic lock mechanism or the like is also used as an actuator hold mechanism. The inertial latch mechanism operates when a shock is given to the disk drive device, and it is a mechanism for latching the actuator by using the inertial force generated by the given shock. This inertial latch mechanism can latch the actuator against a strong shock which cannot be handled only by the above magnetic lock mechanism or the like. When a weak shock is given, the above actuator hold mechanism holds the actuator because the inertial latch mechanism does not work, thereby increasing the reliability of the actuator lock mechanism.

As an example, the actuator lock mechanism using such inertial latch mechanism is shown in FIGS. 15 and 16. The actuator lock mechanism shown in FIGS. 15 and 16 uses a ramp of the load/unload mechanism as the actuator hold mechanism. In the inertial latch mechanism shown in FIG. 15, when a shock is given to cause an actuator 22 to rotate counterclockwise (to the disk 1 side), a latch lever 101 is rotated counterclockwise on a pivot by an inertial force, and a latch protrusion 102 abuts on the coil arm end 26c of the actuator 22 to latch the actuator 22. Further, the inertial latch mechanism shown in FIG. 16 uses two balls 202, and the two balls push a latch lever 201 by an inertial force and the latch lever 201 latches the actuator 22 centering a pivot.

An example of the actuator lock mechanism using the inertial latch mechanism is disclosed in Published Unexamined Patent Application No. 8-339645 by the applicant of the present invention. The actuator lock mechanism of Published Unexamined Patent Application No. 8-339645 includes an inertial latch mechanism as shown in FIG. 15, and includes as an actuator hold mechanism a magnetic or electromagnetic lock mechanism for latching the actuator by magnetism or electromagnetism.

A part provided on a pivot for free rotation, such as an actuator, is generally given a linear acceleration and an angular acceleration by an external shock. The force of a linear acceleration (translational force) works on the center of mass, and the force of angular acceleration (couple) works about the pivot. Assume a circle having a center which is the pivot, and which passes through the center of mass. It is assumed that the tangential component at the center of mass of the circle is an effective component, and the normal component at the center of mass is an ineffective component. Those which contribute to the rotation of the above part are the effective components of the angular acceleration and linear acceleration. The shock given to the actuator can be represented as shown in FIG. 11, in which the above angular acceleration A is the abscissa and the effective component Le of the above linear acceleration is the ordinate. A diagonally shaded region Ea in FIG. 11 is the region of a shock that can be given to the actuator.

When a large shock is given to rotate the actuator 22 shown in FIGS. 15 and 16 in the clockwise direction (opposite to the disk 1), the actuator bumps against a crash stop (elastic body) 5, and it may rebound to the disk 1 side. Accordingly, the shock regions for which the inertial latch mechanism must latch the actuator are diagonally shaded regions Eb1 and Eb2 shown in FIG. 12. However, in the actuator lock mechanism and the inertial latch mechanism which are shown in FIG. 15, when a shock is given to rotate the actuator 22 clockwise (to the crash stop 5 side), the inertial latch mechanism which reversely rotates does not work and cannot latch the actuator 22. That is, in the inertial latch mechanism as shown in FIG. 15, there are considerable dead zones, as shown by diagonally shaded regions Ee1 and Ee2 in FIG. 17. The dead zones mean the regions in which the inertial latch mechanism does not operate, in the diagonally shaded shock regions Eb1 and Eb2 (refer to FIG. 11) in which the inertial latch mechanism must operate. It can be said that an inertial latch mechanism having large dead zones has low reliability.

Further, in the inertial latch mechanism shown in FIG. 16, two balls are used to enable the inertial latch mechanism to operate regardless of the direction in which a shock is given, thereby to reduce such dead zones. However, as shown by a diagonally shaded region Ef in FIG. 18, a dead zone occurs when the roll acceleration A is considerably larger than the effective component Le of the linear acceleration, and to reduce the dead zone (region Ef), it is needed to make the mass of the balls larger or decrease the moment of inertia of the latch leaver. There is limitation on the decrease of the moment of inertia of the latch lever, and if the mass of the balls is made larger, it is difficult to mount the inertial latch mechanism on a thin-type disk drive device.

The present invention is to solve such background art problems, and its object is to provide an inertial latch mechanism for an actuator which is highly reliable and can be mounted even on a thin-type disk drive device.

SUMMARY OF THE INVENTION

To accomplish the above object, the inertial latch mechanism of the present invention is characterized by comprising not only a latch lever, but also an inertial lever having a moment of inertia larger than that of the latch lever, for rotating in a first direction to latch the latch lever at a first latch position for moving the latch lever to an actuator latch position when a shock is given to rotate the actuator in the first direction, and rotating in a second direction to latch the latch lever at a second latch part for moving the latch lever to the actuator latch position when a shock is given to rotate the actuator in the second direction.

In the above inertial latch mechanism, when the actuator is at the rest position, it is preferred that the angle between the direction from the pivot of the actuator to the center of mass of the actuator and the direction from the second pivot of the inertial lever to the center of mass of the inertial lever is an acute angle.

Further, the actuator lock mechanism of the present invention is characterized by comprising the above inertial latch mechanism, and an actuator hold mechanism for holding the actuator at the rest position for a weak shock for which the inertial latch mechanism does not work.

As the above actuator hold mechanism, a ramp block, which is also a structural part of the load/unload mechanism, and a magnetic lock mechanism are used.

PREFERRED EMBODIMENT OF THE INVENTION

Figure 1:
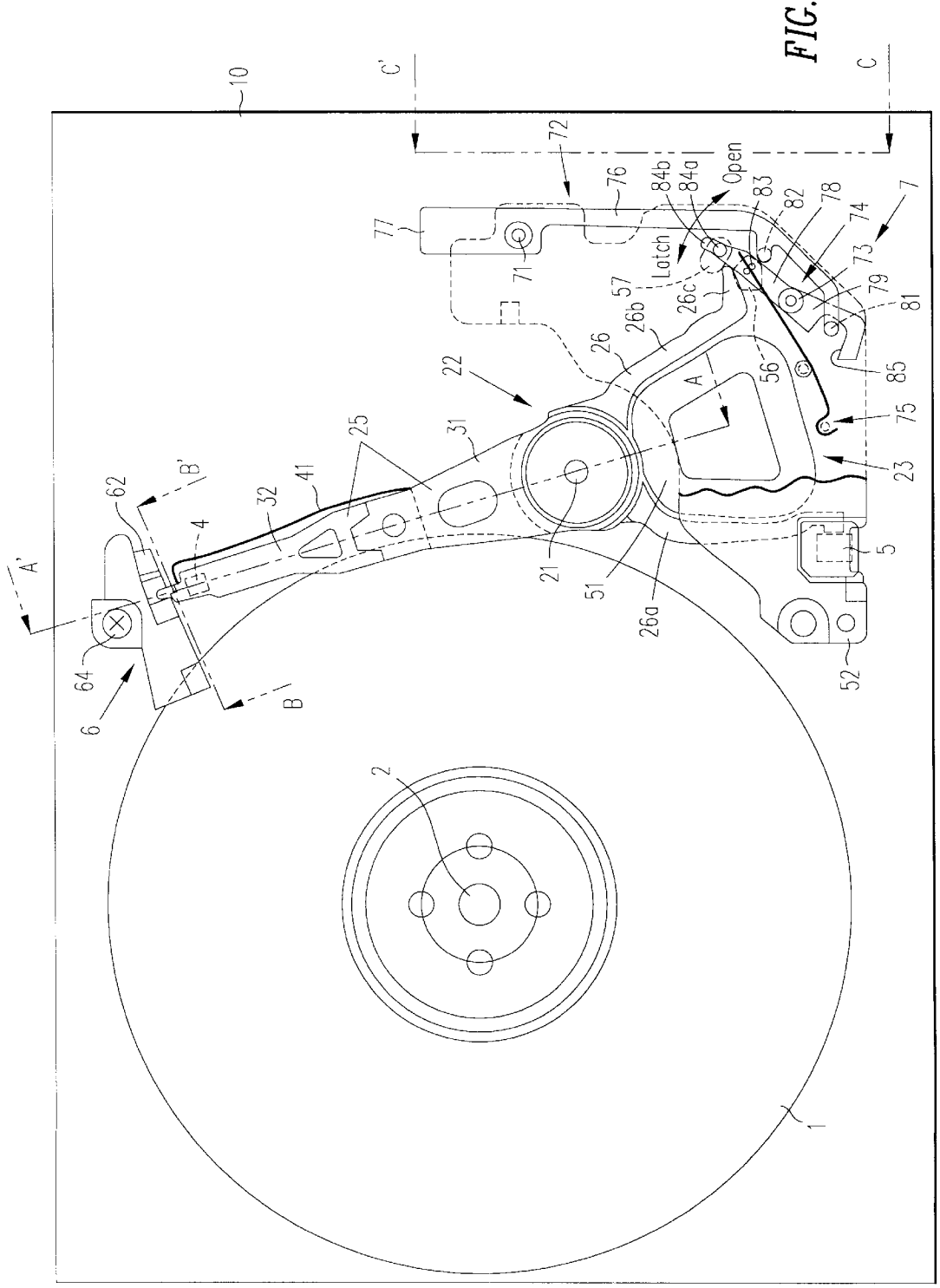
FIG. 1 is a plan view showing the schematic construction of an embodiment of the disk drive device of the present invention.
Figure 2:
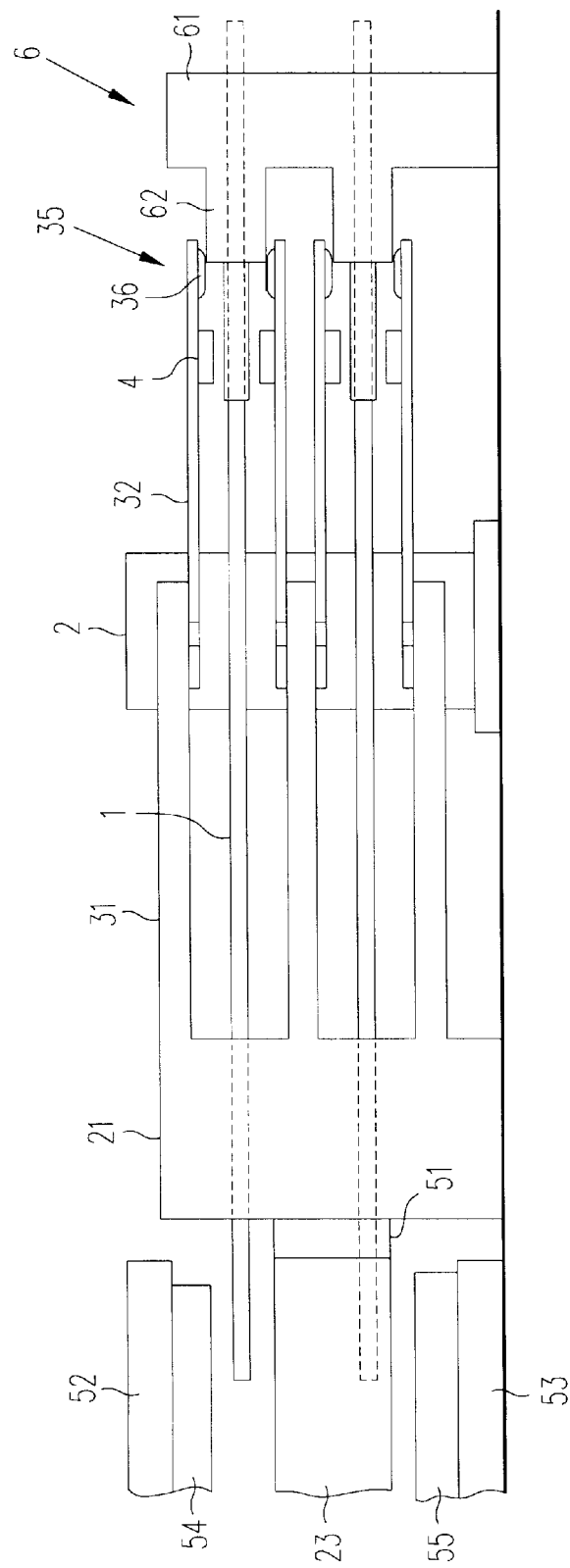
FIG. 2 is a sectional view along A–A' in FIG. 1.
Figure 3:
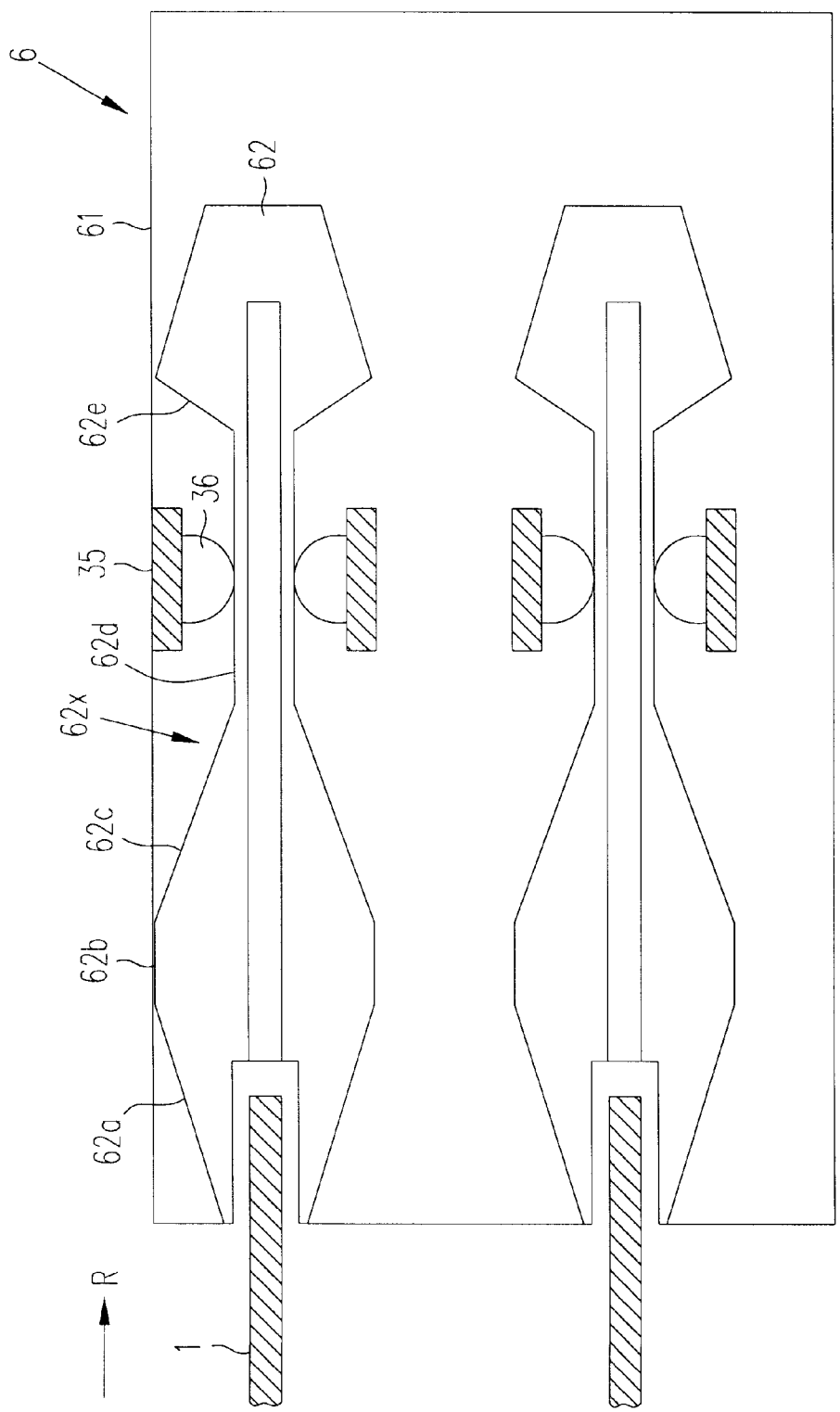
FIG. 3 is a sectional view along B–B' in FIG. 1.
Figure 4:
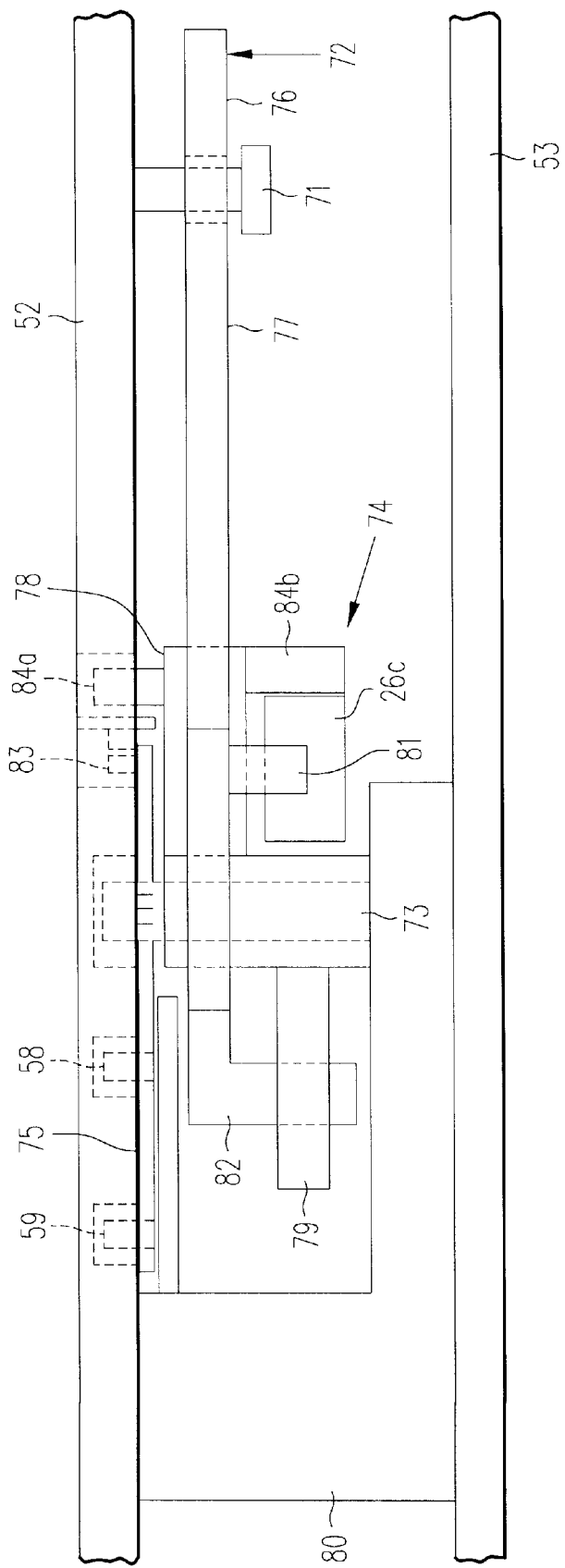
FIG. 4 is a sectional view along C–C' in FIG. 1.

FIG. 1 is a plan view showing the schematic construction of the disk drive device of an embodiment of the present invention. In FIG. 1, the top cover of the enclosure is removed, and part of the upper yoke is broken. FIG. 2 is a sectional view along A–A' in FIG. 1, and FIG. 3 is a sectional view along B–B' in FIG. 1. FIG. 4 is a sectional view along C–C' in FIG. 1.

In the disk drive device shown in FIGS. 1 to 4, an enclosure 10 contains a disk 1 such as a magnetic disk which is a data recording medium, a spindle motor 2 for rotationally driving the disk 1, an actuator 22 on which a head slider 4 is mounted, a voice coil motor (VCM) 23 for rotationally driving the actuator 22, a crash stop 5 for limiting the rotation range of the actuator 22, a ramp block 6 provided at the rest position of the actuator 22, an inertial latch mechanism 7 of the present invention forming an actuator lock mechanism, etc. This disk drive device includes a load/unload mechanism for the actuator 22, and an actuator lock mechanism using an inertial latch mechanism, and it unloads the actuator 22 to the rest position when the operation of the disk drive device is stopped, and holds the actuator 22 at the rest position while the disk drive device is inoperative. The ramp block 6 constitutes the above load/unload mechanism as well as the actuator lock mechanism.

The disk 1 is fixed to the rotor portion of the spindle motor 2. The disk 1 is driven to rotate about the spindle shaft of the spindle motor 2 when the disk drive device is operating, and stops its rotation (stands still) when the disk drive device is not operating. On the surface of the disk 1, tracks are concentrically arranged for recording data and servo information. There are two disks 1 in this embodiment, but any number of disks may be used.

Figure 5:
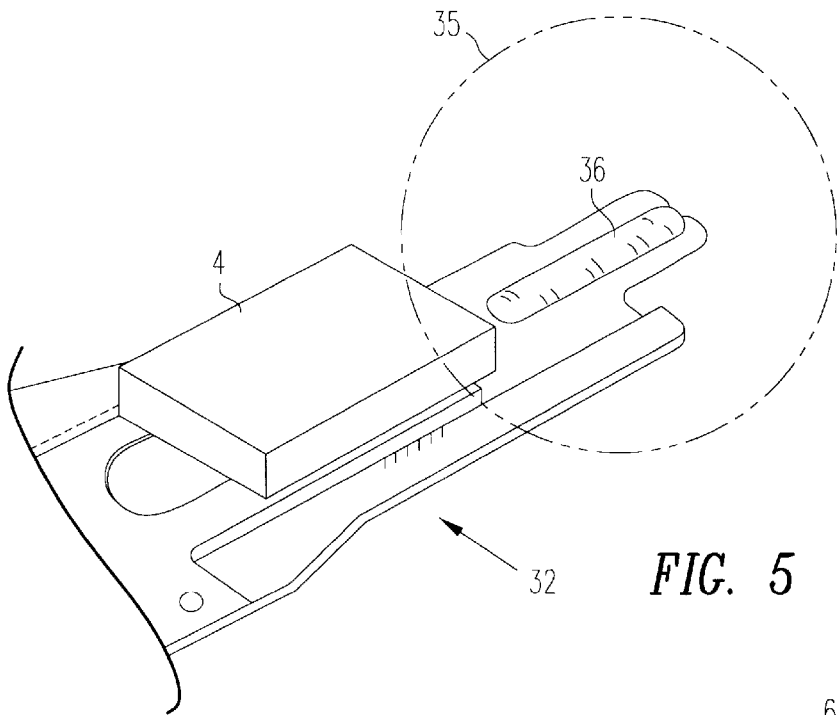
FIG. 5 is a perspective view of the suspension arm in an embodiment of the disk drive device of the present invention.

The actuator 22 has a head arm 25 and a coil arm 26, and it is fitted over a pivot 21 for free rotation, that is, it is provided so as to be rotatable on the pivot 21. The head arm 25 and the coil arm 26 are disposed on both sides of the pivot 21 so as to be opposite to each other. The coil arm 26 consists of an outer arm 26a and an inner arm 26b. The head arm 25 has a carriage arm 31, and a suspension arm 32 suspended by the carriage arm 31. FIG. 5 is a perspective view in which the suspension arm 32 is seen from the side facing the disk 1 surface. As shown in FIG. 5, the suspension arm 32 has a tab 35 for taking refuge in the ramp block 6. The tab is held by the ramp block 6 when the head arm 25 moves to the rest position. In the tab 35, a projecting portion 36 contacts the ramp block 6. Further, on the suspension arm 32, a head slider 4 is mounted. The head arm 25 is formed into a plurality of combs. When the head arm 25 is moved to the space in which the disks 1 are disposed, the head arm 25 is positioned not only between each disk 1, but also over the uppermost disk 1 and under the lowermost disk 1.

The head slider 4 is attached to the head arm 25 so as to face the upper and lower surfaces of the disk 1, respectively, and connected to a control unit, not shown, by a head wire 41 or the like. The head slider 4 has a head element (not shown) for recording data from the control unit on tracks on the disk 1 surface, and reading and sending the data recorded on tracks to the control unit.

The VCM 23 comprises a voice coil 51 mounted on the inner surface of the coil arm 26, an upper yoke 52 and a lower yoke 53, a permanent magnet 54 provided on the underside of the upper yoke 52, a permanent magnet 55 provided on the upper surface of the lower yoke 53, etc. To the voice coil 51, a drive current is fed from a control unit. The coil arm 26 is disposed in a space sandwiched between the upper yoke 52 and the lower yoke 53.

The crash stop 5 is an elastic body provided for forcibly stopping the rotation of the actuator by abutting on the outer arm 26a of the coil arm when the VCM 23 runs away, thereby for preventing the actuator 22 from bumping against the spindle motor 2 or other structural mechanisms of the device.

Figure 6:
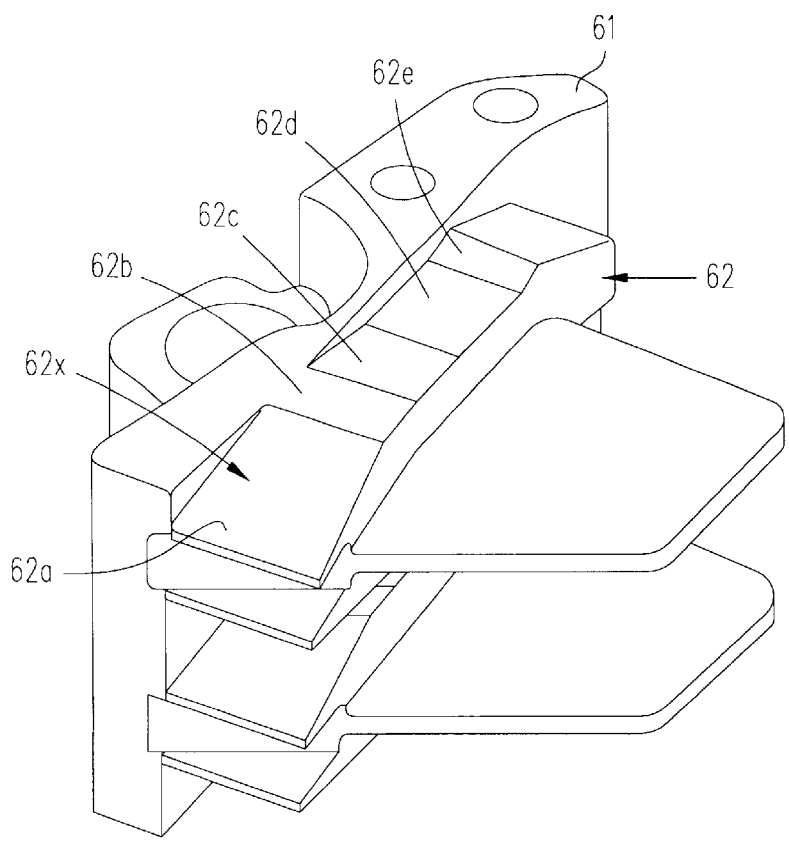
FIG. 6 is a perspective view of the ramp block in an embodiment of the disk drive device of the present invention.

FIG. 6 is a perspective view of the ramp block 6. As shown in FIGS. 3 and 6, the ramp block 6 has a plurality of ramps 62 provided so as horizontally project from the side of a ramp support 61. Each ramp 62 has composite planes 62x on the upper side and the underside thereof. These composite planes 62x are provided so as to correspond to the tab 35, respectively. The upper composite plane 62x contains a first slope 62a, a top plane 62b, a second slope 62c, a bottom plane 62d, and a third slope 62e. The first slope 62a, top plane 62b, second slope 62c, bottom plane 62d, and third slope 62e are arranged in the order of this in the direction (shown by an arrow R) of the movement of the tab's projecting portion 36 which is due to the rotation of the suspension arm 32 in the unloading, that is, substantially outwardly of the radial direction of the disk 1. The first slope 62a is high in the side near the second slope 62c, and the second slope 62c and the third slope 62e are low in the side near the bottom plane 62d. The top plane 62b is approximately horizontal. The composite plane 62x on the underside is formed in a manner similar to the composite plane 62x on the upper side, though not shown in the drawings. However, it is opposite in the orientation of the slopes 62a, 62c, and 62e. The ramp block 6 is fixed to the enclosure 10 by a screw 64 (refer to FIG. 1). The actuator 22, VCM 23, and ramp block 6 make up a load/unload mechanism.

Figure 7:
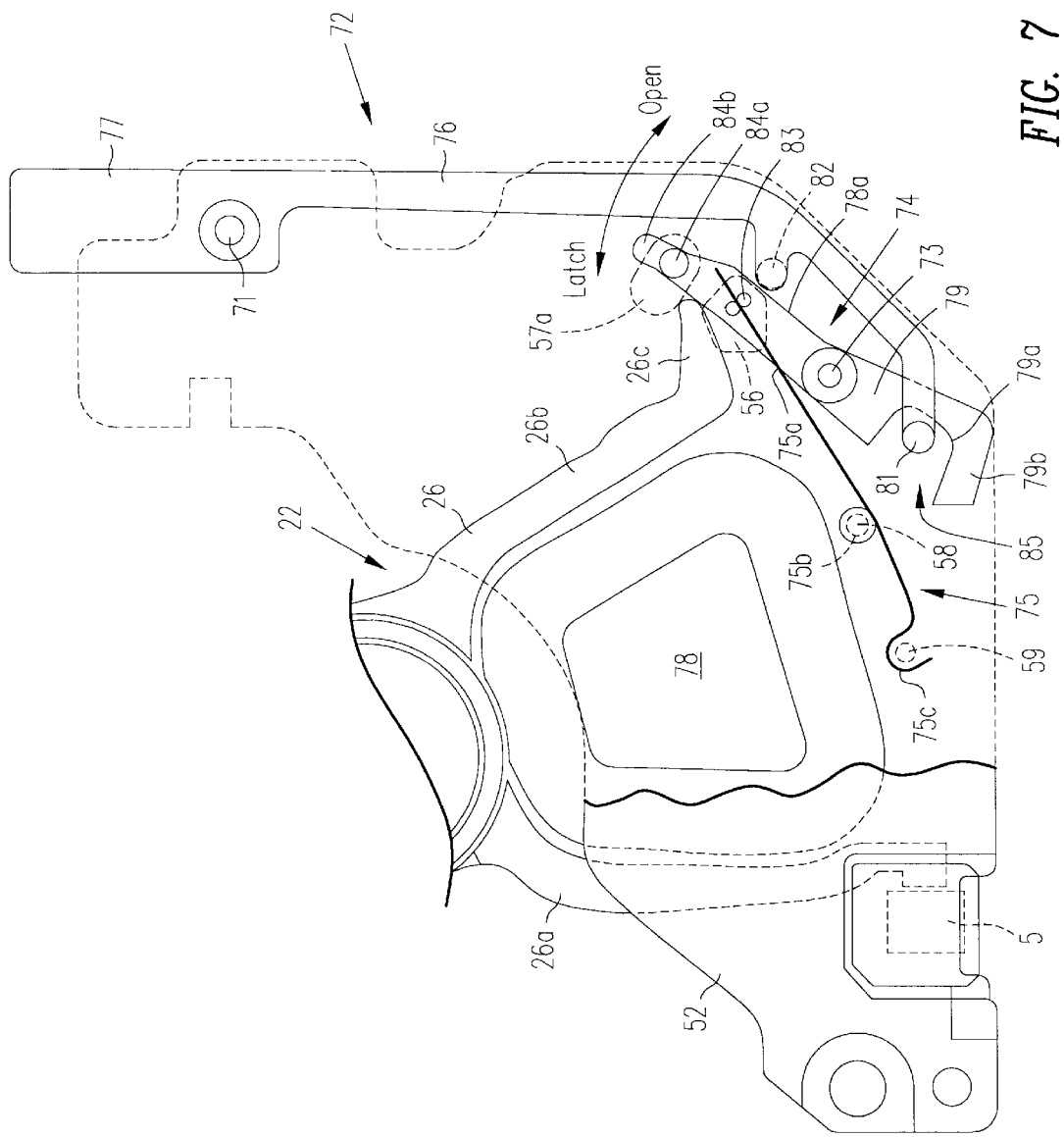
FIG. 7 is a plan view of the surrounding portion of the inertial latch mechanism in an embodiment of the disk drive device of the present invention.
Figure 15:
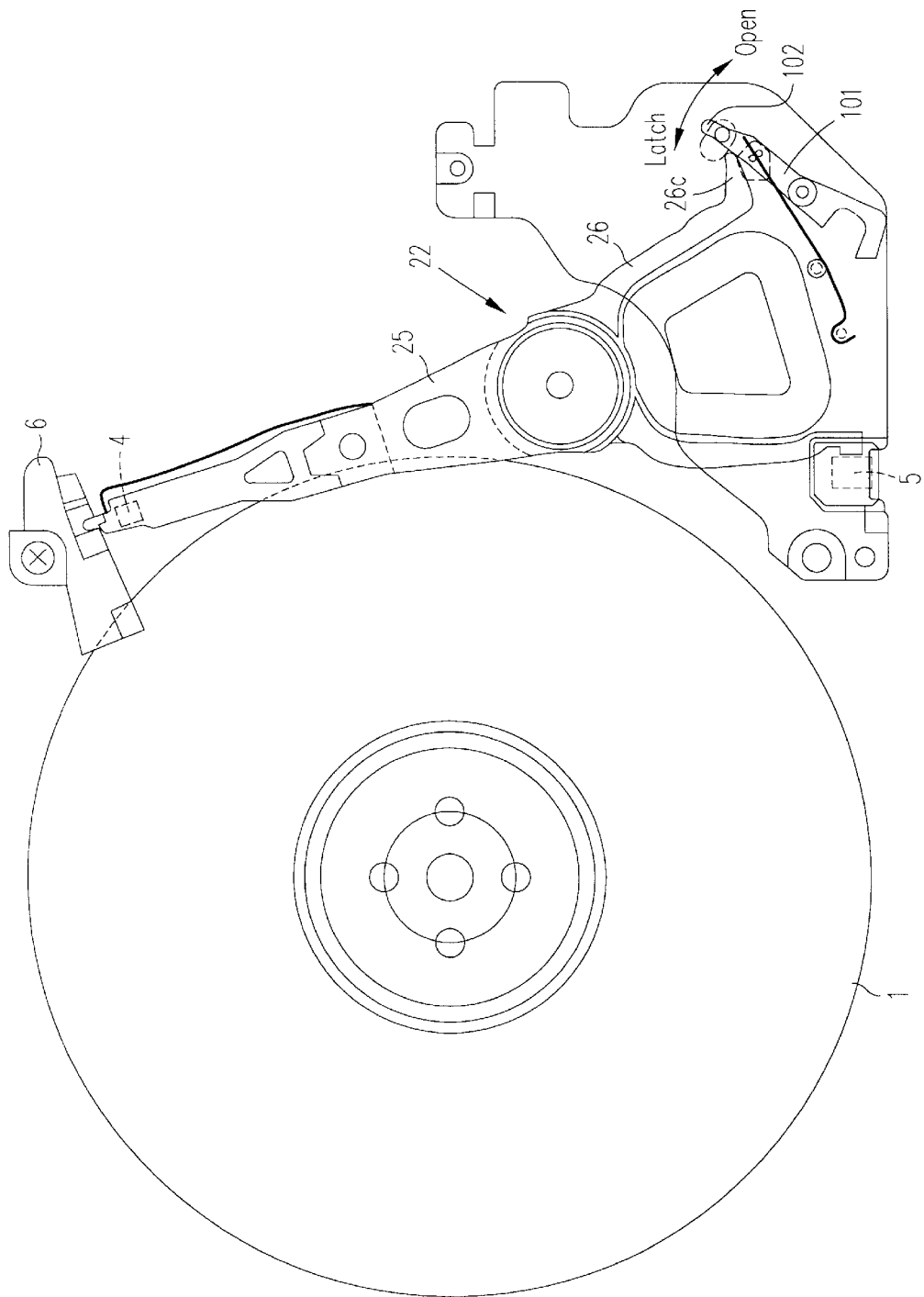
FIG. 15 is a plan view showing the construction of the conventional latch mechanism.
Figure 16:
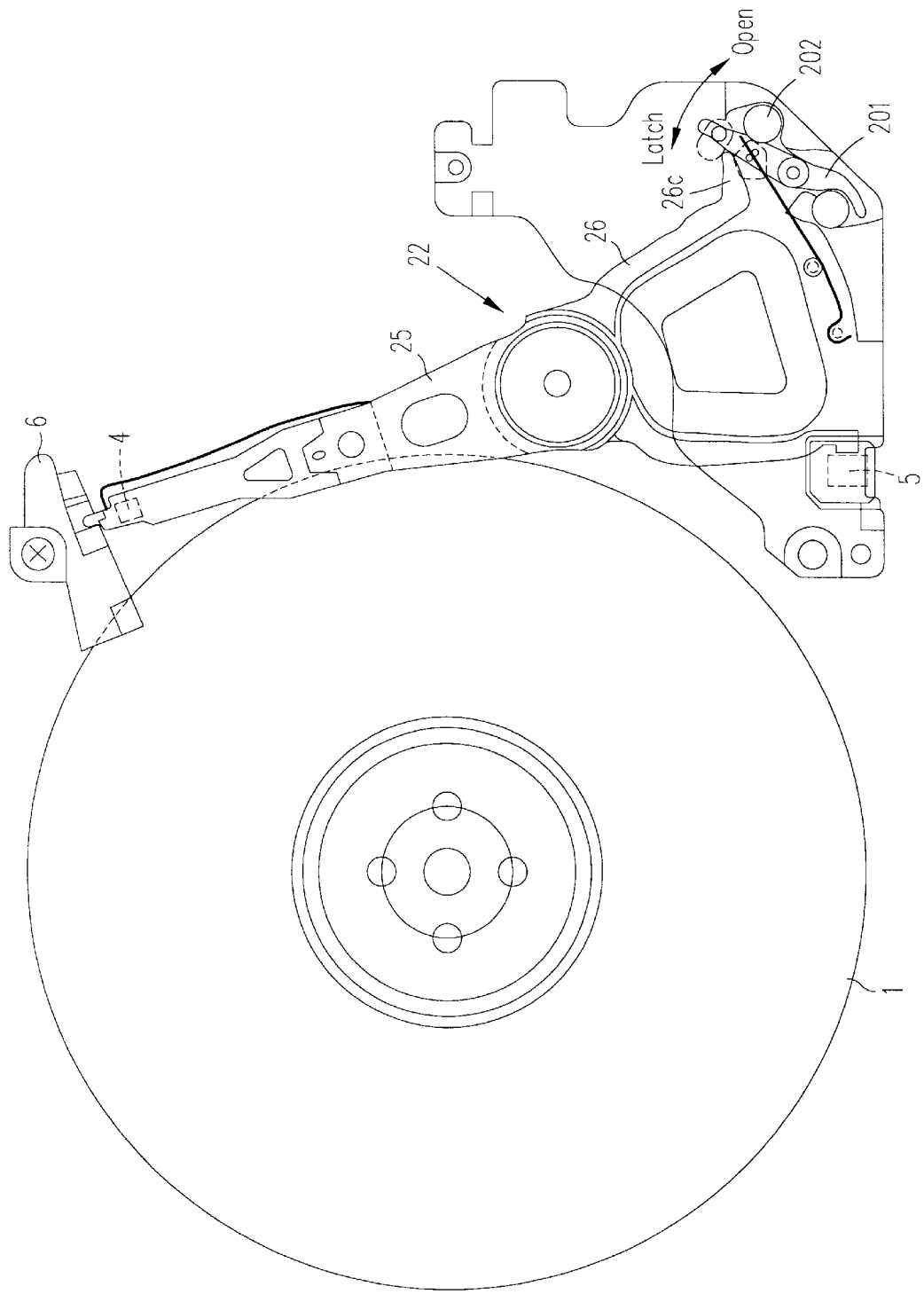
FIG. 16 is a plan view showing the construction of the conventional latch mechanism using balls.

FIG. 7 is an enlarged view of the peripheral portion of the inertial latch mechanism 7 in FIG. 1. In FIGS. 1, 4 and 7, the inertial latch mechanism 7 is made up of an inertial lever 72 rotatable on a pivot 71, a latch lever 74 rotatable on a pivot 73, and a spring 75 for holding the latch lever 74 at an arm release position. The moment of inertia of the inertial lever about the pivot 71 is greater than the moment of inertia of the latch lever 74 about the pivot 73. That is, the inertial latch mechanism 7 of the present invention is different from the conventional latch mechanism shown in FIG. 15 or 16 and the inertial latch mechanism disclosed in Published Unexamined Patent Application No. 8-339645, in the point that it has the inertial lever 72 whose moment of inertia is greater than that of the latch lever 74.

The inertial lever 72 has an inertial arm 76 and a balance arm 77 which are extending while mutually making an obtuse angle with resect to the pivot 71. In the inertial arm 76, there are formed a first latch projection 81 for latching the latch lever 74 at a first latch part 85, and a second latch projection 82 for latching the latch lever 74 at a second latch part 86. Although the pivot 71 is disposed in the upper yoke 52, it may be disposed in the lower yoke 53. Further, the latch lever 74 has a latch arm 78 and an auxiliary arm 79 which are extending while mutually making an obtuse angle with respect to the pivot 73. In the latch arm 78, there are formed two spring latch projections 83 for latching the operation side end 75a of a spring 75, a positioning projection 84a, and a latch projection 84b. The positioning projection 84a is to determine the actuator release position and the actuator latch position for the latch lever 74. Further, the latch projection 84b latches the end portion 26c of the inner arm 26b of the actuator 22 to latch the actuator 22 when the latch lever 74 moves to the actuator latch position. The spring support projection 83 is fitted in a hole 56 provided in the upper yoke 52. The positioning projection 84a is fitted in a hole 57 provided in the upper yoke 52. In addition, the pivot 73 is disposed in a holder 80, but it may be disposed in the upper yoke 52 or the lower yoke 53.

The hole 57 is to decide the actuator release position and actuator latch position of the latch lever 74. The actuator release position of the latch lever 74 is a position for the positioning projection 84a to abut on the inner surface 57a of the hole 57 which is opposite to the actuator 22. Further, the actuator latch position of the lever 74 is a position for the positioning projection 84a to abut on the inner surface 57b of the hole 57 which is on the actuator 22 side. Further, the operation side end 75a latches between the two spring support projections 83 of the latch lever 74, and a supporting point 75 and a key-shaped fixed side end 75c are latching projections 58 and 59 provided in the holder 80, respectively. The spring 75 is provided to give a clockwise torque to the latch lever 74 to position the latch lever at the actuator release position, and it corresponds to a bias means.

When the latch lever 74 is at the actuator release position, the first latch projection 81 of the inertial lever 72 abuts, at the first latch projection 85, on the side 78a of the latch arm 78 which is opposite to the actuator 22, or it is slightly away from the side 78a, while the second latch projection 82 abuts on the inner surface 79a of a key portion 79b formed toward the actuator 22 side, or it is slightly away from the inner surface 79a. Further, the inertial latch mechanism 7 and the ramp block 6 are forming an actuator lock mechanism.

A control unit, not shown, feeds a drive current through the voice coil 51 of the VCM 23 when the disk drive device stops its operation, thereby to unload the head arm 25 of the actuator 22 to the rest position. Further, it loads the head arm 25 from the rest position when the disk drive device starts to operate, moves the head slider 4 over the surface of the disk 1 which has started to rotate, and moves the head slider 4 to a desired data track based on the servo data read by the head element of the head slider 4. FIG. 1 shows the head arm 25 as unloaded to the rest position.

When the disk drive device is not operating, the head arm 25 of the actuator 22 and the head slider 4 are unloaded at the rest position. When the head arm 25 is at the rest position, the tab 35 of the suspension arm 32 is held on the bottom plane 62d of the ramp 62 as shown in FIG. 3. Further, the disk 1 is at rest.

When the above head arm 25 is unloaded, the tab projection 36 of the suspension arm 32 first contacts with the first slope 62a, climbs up the first slope 62a while sliding to the slope 62c, slides the top plane 62b and reaches the second slope 62c, and slides down the second slope 62c and reaches the bottom plane 62d. Further, when the above head arm 25 is loaded, the projection 36 slides through a route which is a reversal of the route for the unloading, in the order of the bottom plane 62d, second slope 62c, top plane 62b, and first slope 62a, leaving the ramp 62.

The ramp 62 functions as an actuator hold mechanism which prevents the head arm 25 from moving from the rest position to the disk 1 side or the opposite side and holds the head arm 25 at the rest position for a weak shock for which the inertial latch mechanism 7 does not work, when the head arm 25 is unloaded at the rest position and the tab 35 is held on the ramp 62. If a weak shock is given to move the head arm 25 to the disk 1 side (in the counterclockwise direction in FIG. 1), the projection 36 of the suspension arm 32 climbs up the second slope 62c, whereby the vibrational energy of the head arm 25 is attenuated to control the movement of the head arm 25.

Now, description is made to the locking operation of the actuator for a shock given to the disk drive device when it is inoperative. In this case, the inertial latch mechanism 7 operates as described below to latch the actuator 3 for preventing the head arm 25 and head slider 4 from entering the space in which the disk 1 is disposed.

Figure 8:
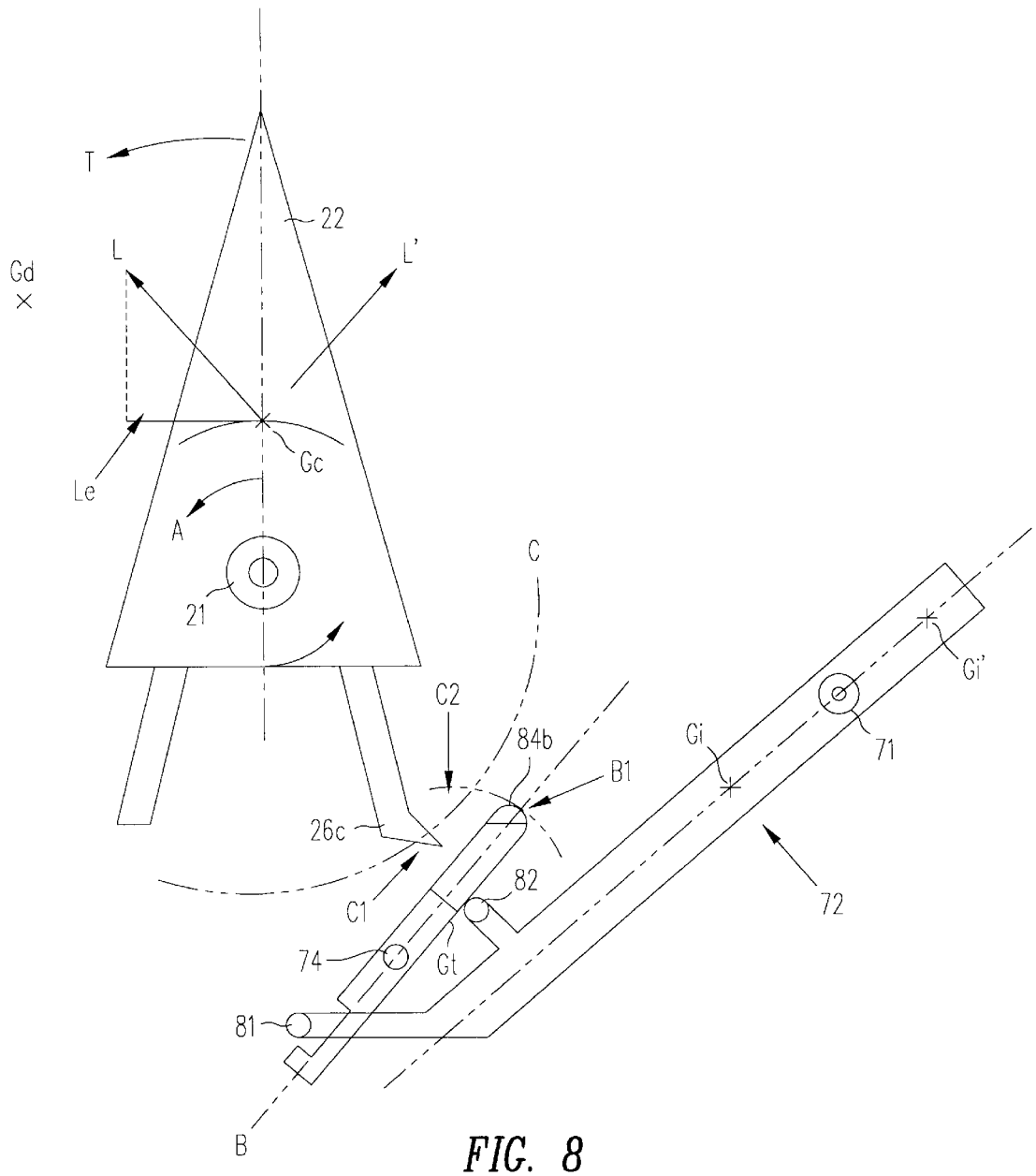
FIG. 8 is a diagrammatic view showing the positional relationships between the actuator, inertial lever, and latch lever when the latch lever is at the actuator release position, in an embodiment of the disk drive device of the present invention.
Figure 9:
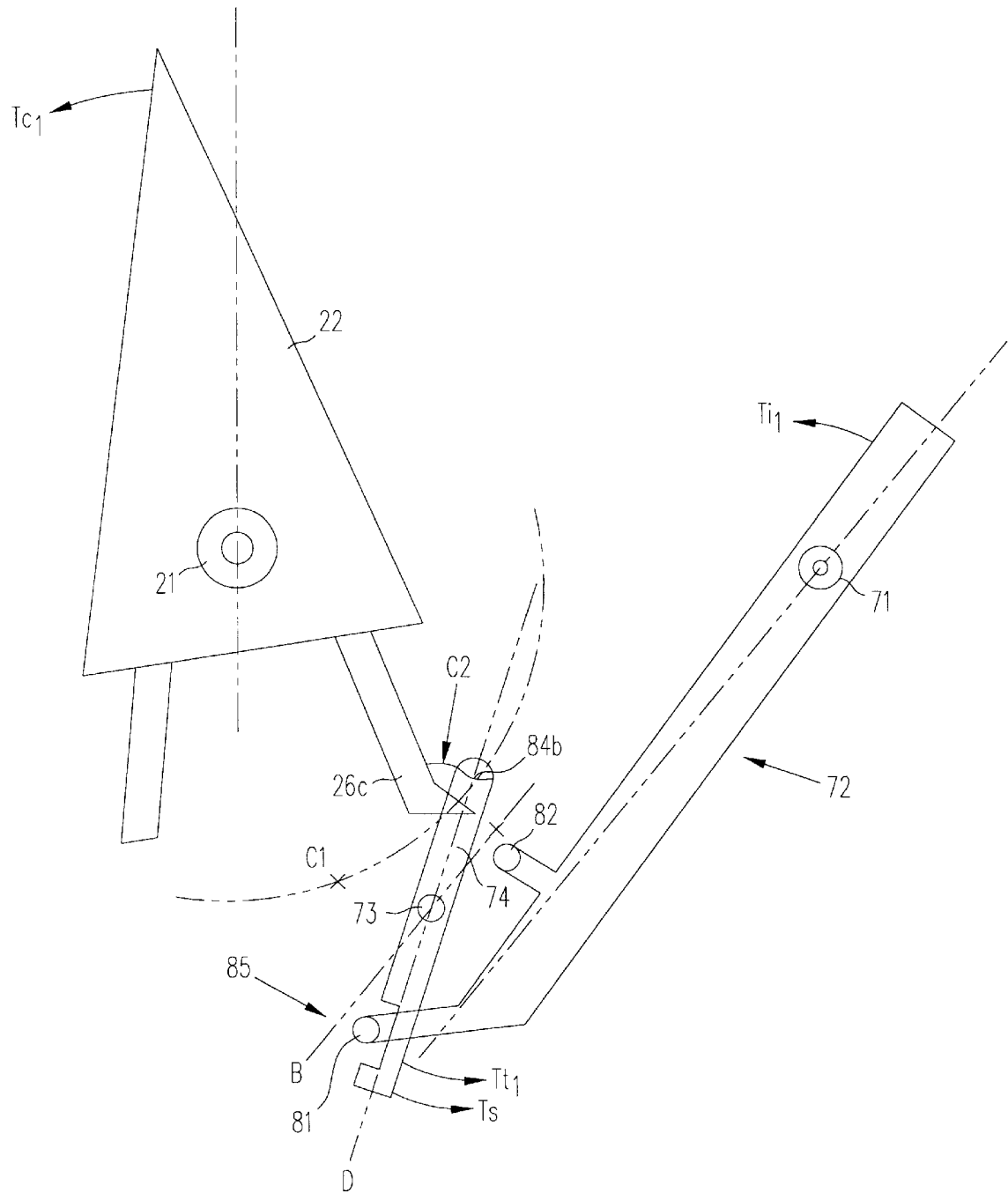
FIG. 9 is a figure showing the operation of the inertial latch mechanism when an external shock causes a torque for rotating the actuator counterclockwise, in an embodiment of the disk drive device of the present invention.
Figure 10:
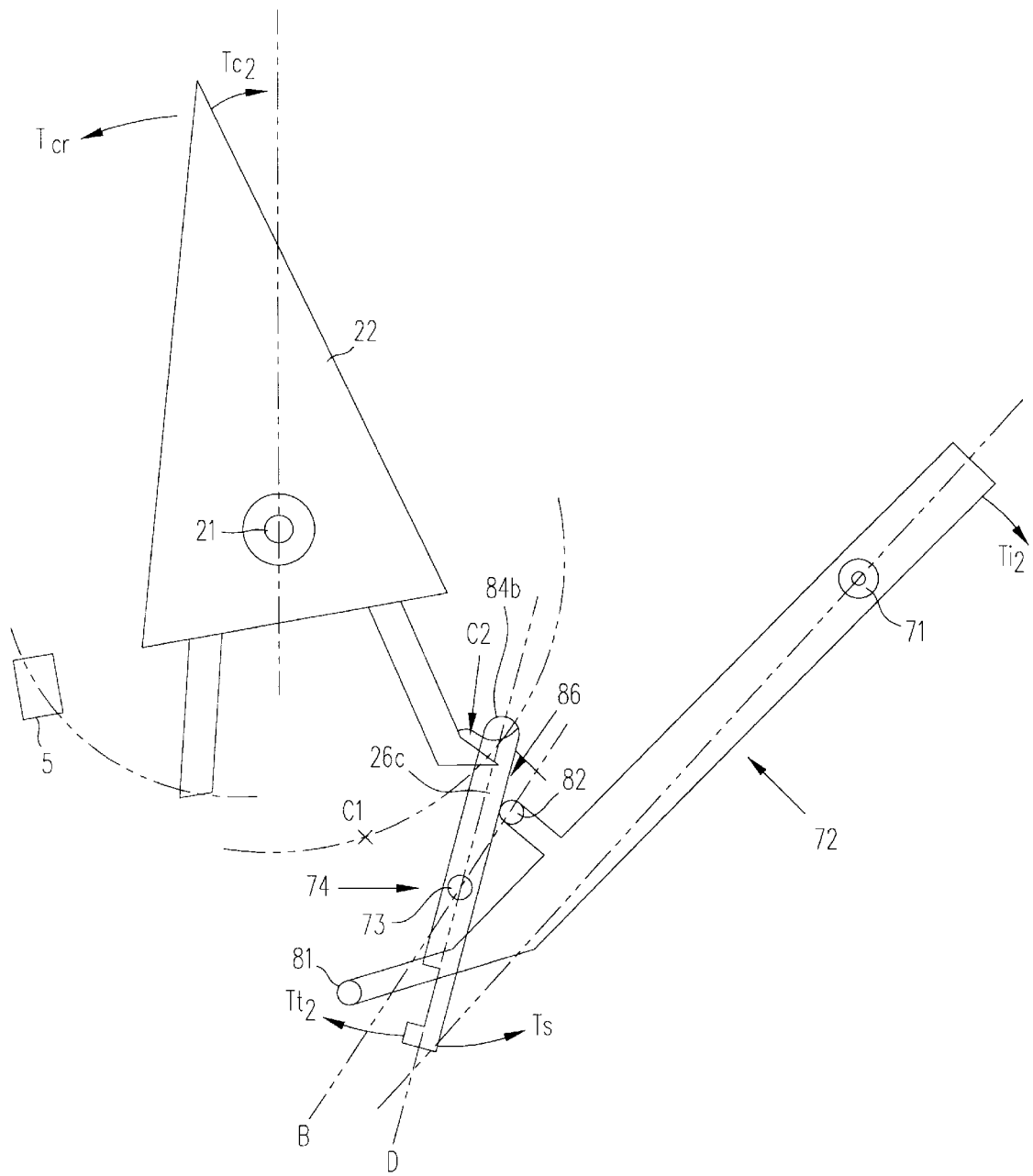
FIG. 10 is a figure showing the operation of the inertial latch mechanism when an external shock causes a torque for rotating the actuator clockwise, in the inertial latch mechanism in the disk drive device of the embodiment of the present invention.

FIGS. 8 to 10 are figures for explaining the operation principle of the latch mechanism 7. FIG. 8 is a diagrammatic illustration showing the positional relationships between the actuator 22 (particularly the inner arm 26b), the inertial lever 72, and the latch lever 74 when the latch lever 74 is at the actuator release position B. FIG. 8, the latch projection 84b of the latch lever 74 exists at a position off the locus of rotation C of the inner arm end portion 26c.

A part provided on a pivot for free rotation, such as the actuator 22, receives a linear acceleration and an angular acceleration by an external shock given to the disk drive device. If it is assumed that the linear acceleration received by the actuator 22 is L and the angular acceleration is A, the force (translational force) due to the linear acceleration L acts on the center of mass of the actuator 22, and the force (couple) due to the angular acceleration A acts about the pivot 21. Hereinafter, the linear acceleration due to the shock is referred to as a linear shock acceleration, and the angular acceleration due to the shock is referred to as an angular shock acceleration. The direction of the angular shock acceleration A is to be the direction when the disk drive device is assumed to be a static system. The direction of the linear shock acceleration L matches the direction of the linear acceleration component given to the disk drive device by the shock. Further, since the angular shock acceleration A is generated by an inertial force for keeping the actuator at the original position, it has a direction reverse to the direction of the angular acceleration component given to the disk drive device by the shock (the center is the center of mass Gd of the disk drive device). Accordingly, if the direction of the angular acceleration component received by the disk drive device is clockwise with respect to the center of mass Gd of the disk drive device, the actuator 22 is acted on by the angular shock acceleration A which is counterclockwise with respect to the pivot 21. When the linear shock acceleration L acts on the actuator 22, a linear acceleration having the same direction as the linear shock acceleration L also acts on the inertial lever 72 and the latch lever 74. Further, when the counterclockwise angular shock acceleration A acts on the actuator 22, a counterclockwise angular acceleration centering the pivot 71 acts on the inertial lever 72, and a counterclockwise angular shock acceleration centering the pivot 73 acts on the latch lever 74.

When the linear and angular accelerations are constant, the magnitude of the translational force depends on the mass of the part, and the magnitude of the couple depends on the magnitude of the moment of inertial of the part about the pivot. A circle centering the pivot and passing through the center of mass is supposed, and it is assumed that the tangential component at the center of mass of the circle is an effective component and the normal component at the center of mass is an ineffective component. Contributing to the rotation of the above part are the effective component of the linear acceleration (translational force) and the angular acceleration (couple). The ineffective component of the linear acceleration (translational force) does not contribute to the rotation of the above part. Accordingly, a composite force of the couple and the effective force of the translational force becomes a torque causing the part to rotate. In the actuator 22, a composite force of the couple due to the angular shock acceleration A and the force due to the effective component Le of the linear shock acceleration L becomes a torque T causing the actuator 22 to rotate. Since both the couple due to the angular shock acceleration A and the force due to the effective component Le act in the direction of causing the actuator 22 to rotate counterclockwise, the actuator 22 rotates counterclockwise. Similarly, the inertial lever 72 is acted on by a torque causing it to rotate counterclockwise on the pivot 71, and the latch lever 74 is acted on by a torque causing it to rotate counterclockwise on the pivot 73. If the linear shock acceleration has a direction L' in the figure, the force due to the effective component of the linear shock acceleration L' acts in the direction of causing the actuator 22 to rotate clockwise. Accordingly, the magnitude of the torque T causing the actuator to rotate depends on the direction of the linear shock acceleration L even if the magnitude and direction of the angular shock acceleration A and the magnitude of the linear shock acceleration L are constant. In other words, the magnitude of the torque T causing the actuator 22 to rotate depends on the positional relationship between the pivot 21 and the center of mass Gc even if the magnitudes and directions of the angular shock acceleration A and the linear shock acceleration L are constant. Further, the direction of the torque T is reversed if the force due to the effective component of the linear shock acceleration L' is greater than the couple due to the angular shock acceleration A. However, the foregoing is limited to the case in which the pivot 21 and the center of mass Gc are not in coincidence. If the pivot 21 and the center of mass Gc are in coincidence, the linear shock acceleration L does not contribute to the rotation of the actuator 22. Similarly, also for the inertial lever 72 and the latch lever 74, if the pivot and the center of mass are not in coincidence, the magnitude of the torque acting on the levers depends on the direction of the linear shock acceleration, or on the positional relationship between the pivot and the center of mass.

FIG. 9 is a figure showing the latch operation for the case in which a torque Tc1 for rotating the actuator counterclockwise is caused to act on the actuator 22 by an external shock. When the torque Tc1 acts on the actuator 22, the inertial lever 72 is acted on by a torque Ti1 for rotating the inertial lever 72 counterclockwise on the pivot 71. Further, a torque Tt1 for rotating the latch lever 74 counterclockwise on the pivot 73 is caused to act on the latch lever by the above shock. In addition to the torque Tt1, a torque Ts for rotating the latch lever 74 clockwise on the pivot 73 is always caused to act on the latch lever 74 by the spring 75. If Ti1 acting on the inertial lever 72 is larger than the composite force of the torques Tt1 and Ts acting on the latch lever 74, the inertial lever 72 rotates counterclockwise regardless of the direction of the torques acting on the latch lever 74, and pulls the latch lever 74 by the first latch projection 81 at the first latch part 85 to rotate the latch lever 74 counterclockwise. This allows the latch lever 74 to move to an actuator latch position D, and the latch projection 84b moves from a release point B1 (refer to FIG. 8) to a latch point C2 on the locus of rotation of the inner arm end portion 26c. The latch projection 84b having moved to the latch point C2 latches the inner arm end portion 26c having moved from a refuge point C1 to hook the inner arm end portion 26c, for latching the actuator 22. Thereafter, by the action of the second slope 62c of the ramp 62 (refer to FIG. 6), the tab 35 of the actuator 22 is pushed back to the bottom plane 62d of the ramp 62, and the inner arm end portion 26c and the latch projection 84b are disengaged. And, the action of the spring 75 causes the latch arm 75 to return to the actuator release position. It is preferred that, immediately after that, the latched actuator is released from the inertial latch mechanism 7 and returns to the rest position. To achieve this, the inclination of the second slope 62c of the ramp 62, and the shape and slope of the latch surface 26d of the inner arm end portion 26c (refer to FIG. 7) are set.

FIG. 10 is a figure showing the latch operation for the case in which a torque Tc2 for rotating the actuator 22 clockwise is caused to act on the actuator 22 by an external shock. That is, it is a figure showing the latch operation for the case in which the actuator 22 rotates clockwise and the outer arm 26a smashes against the crash stop 5, and the actuator 22 is caused to reversely rotate in the counterclockwise direction by a rebound torque Tcr. When a torque Tc2 due to the above shock acts on the actuator 22, a torque Ti2 acts on the inertial lever 72 for rotating it clockwise on the pivot 71. Further, the torque Tt2 due to the above shock and the torque Ts due to the spring 75 act on the latch lever 74 for rotating it clockwise on the pivot 73. If Ti2 acting on the inertial lever 72 is greater than the clockwise torque (the composite force of the torques Tt1 and Ts) acting on the latch lever 74, the inertial lever 72 rotates counterclockwise overcoming the clockwise torque acting on the latch lever 74, and pushes the latch lever 74 by the second latch projection 82 at the second latch projection 86, for rotating the latch lever 74 counterclockwise. This allows the latch lever 74 to move to an actuator latch position D, and the latch projection 84b moves to a latch point C2 on the locus of rotation C of the inner arm end portion 26c, for hooking the inner arm end portion 26c which has rebounded.

In any of FIGS. 9 and 10, in order that the inertial lever 72 rotates in the directions of the torques Ti1 and Ti2, the torques Ti1 and Ti2 must be greater than the torques Tt1 and Tt2 caused to act on the latch lever 74 by a shock. That is, since it is considered that the angular shock accelerations acting on the inertial lever 72 and the latch lever 74 are substantially equal, the moment of the inertia of the inertial lever 72 should be larger than the moment of inertia of the latch projection 84b from the release point B1 to the latch point C2, the position of the latch point C2, the distance from the latch projection 84b to the pivot 73, and the like are preset so that the latch projection 84b moves to the latch point C2 before the inner arm end point 26c moves from the refuge point C1 to the latch point C2.

Figure 11:
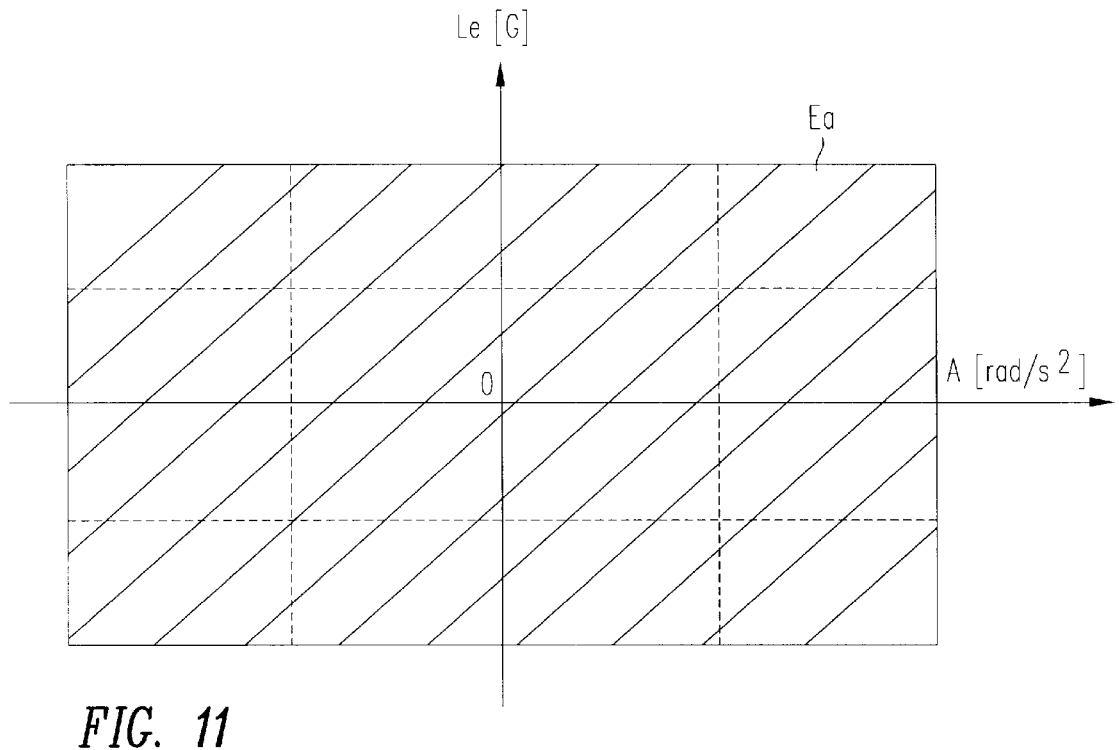
FIG. 11 is a figure showing the shock region applied to the actuator in the disk drive device.
Figure 12:
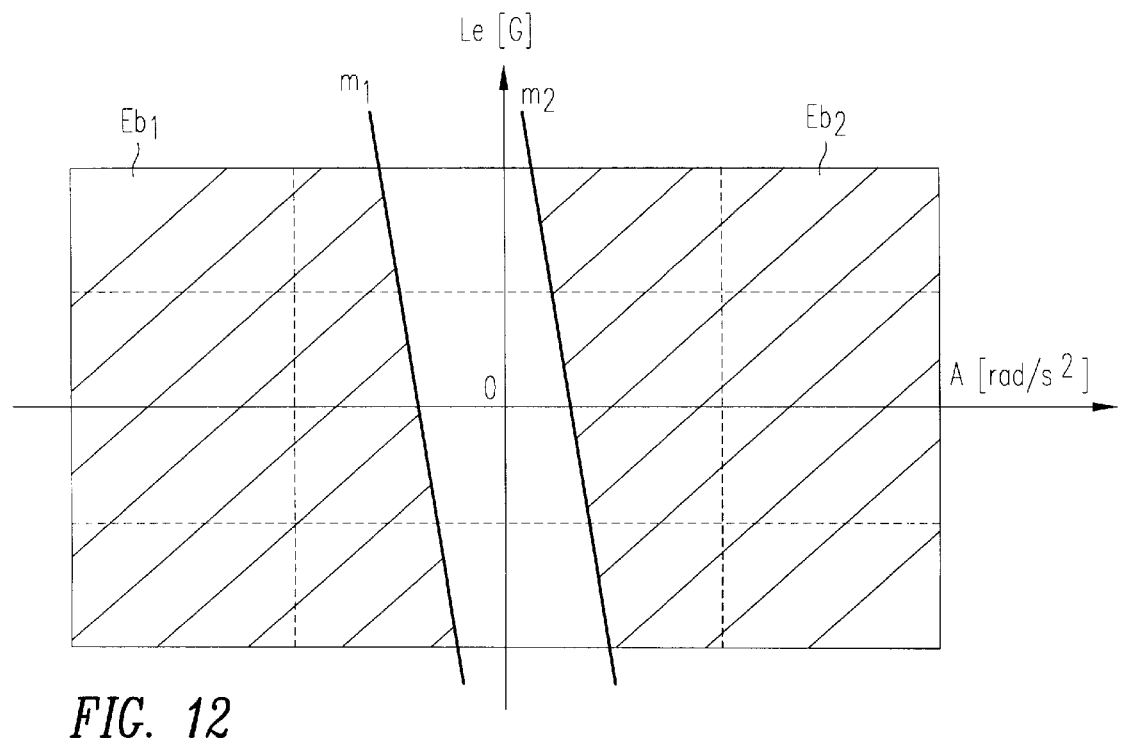
FIG. 12 is a figure showing the shock regions in which the inertial latch mechanism must work in the disk drive device.

FIG. 11 is a figure showing the shock region applied to the actuator 22 of the disk drive device, and FIG. 12 is a figure showing the shock region in which the inertial latch mechanism must work in the disk drive device. In FIGS. 11 and 12, the abscissa represents the angular shock acceleration A acting on the actuator 22, and the ordinate represents the effective component Le of the liner shock acceleration acting on the actuator 22. The angular shock acceleration A is positive in the counterclockwise direction with respect to the pivot 21 of the actuator 22 (the direction shown in FIG. 8), and negative in the clockwise direction. The effective component Le of the linear shock acceleration is also positive in the counterclockwise direction with respect to the pivot 21 (the direction shown in FIG. 8), and negative in the clockwise direction. In a figure in which the angular shock acceleration A and the effective component Le of the liner shock acceleration are represented by the abscissa and the ordinate, respectively, the shock region applied to the actuator 22 can be represented by the diagonally shaded region Ea in FIG. 11. Hereinafter, the shock regional Ea of FIG. 11 is called a total shock region. In the total shock region Ea, the shock regions in which the inertial latch mechanism must operate are diagonally shaded regions Eb1 and Eb2 shown in FIG. 12. The shock region Eb1 in which the inertial latch mechanism must operate is the left part of a straight line m1 in the total shock region Ea, and the shock region Eb2 in which the inertial latch mechanism must operate is the right part of a straight line m2 in the total shock region Ea. The region surrounded by the straight lines m1 and m2 and the region Ea is a shock region in which the actuator 22 can be held by the ramp 6 which is an actuator mechanism.

The reason why the straight line m1 has a negative gradient in FIG. 12 is that, for the same positive angular shock acceleration A, the torque causing the actuator 22 to rotate counterclockwise increases as the effective component Le of the linear shock acceleration increases, making it difficult to prevent the rotation of the actuator 22 only by the ramp 62. Similarly, the reason why the straight line m2 has a negative gradient is that, for the same negative angular shock acceleration A, the torque causing the actuator 22 to rotate clockwise increases as the effective component Le of the linear shock acceleration increases, making it difficult to prevent the rotation of the actuator 22 only by the ramp 62. Further, the reason why the distance between the straight line m2 and the origin O is shorter than the distance between the straight line m1 and the origin O is that torque required by the actuator 22 to rotate clockwise, rebound at the crash stop, and fly out into the space in which the disk 1 is disposed is larger than the torque required by the actuator 22 to rotate counterclockwise from the ramp 62 and fly out into the space in which the disk 1 is disposed. In addition, if the center of mass Gc of the actuator 22 matches the pivot 21, the straight lines m1 and m2 become parallel with each other.

Figure 13A:
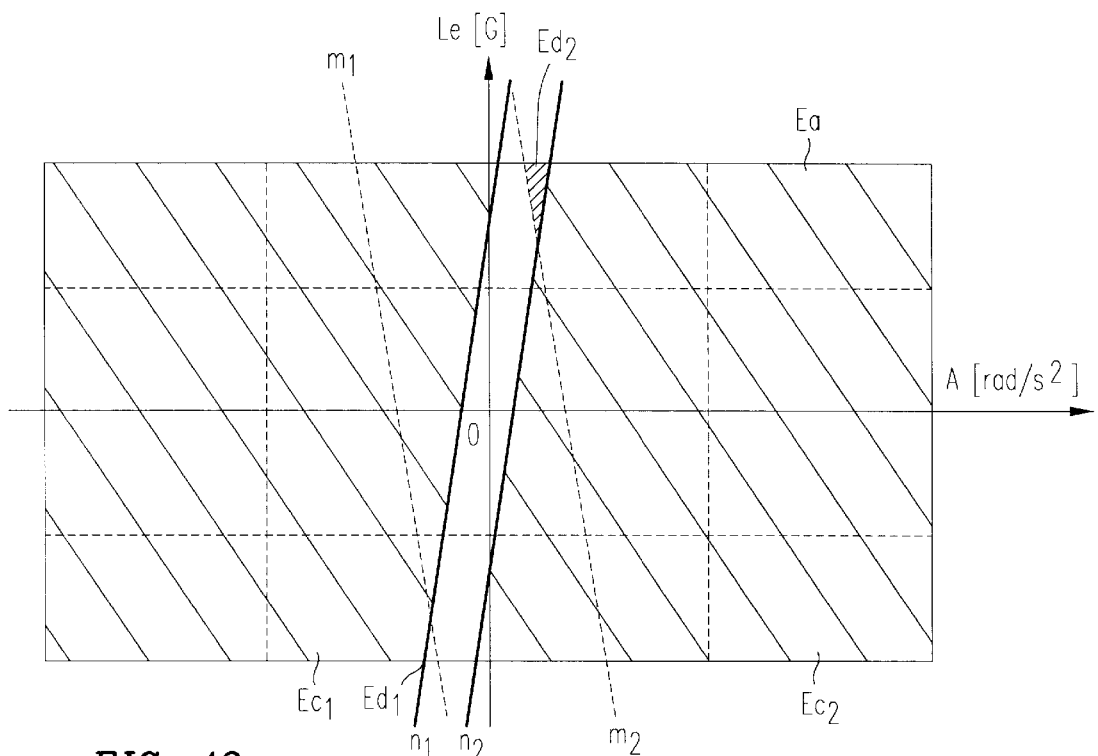
FIG. 13 is a figure showing the shock regions in which the inertial latch mechanism can operate in the disk drive device of the present invention.
Figure 13B:
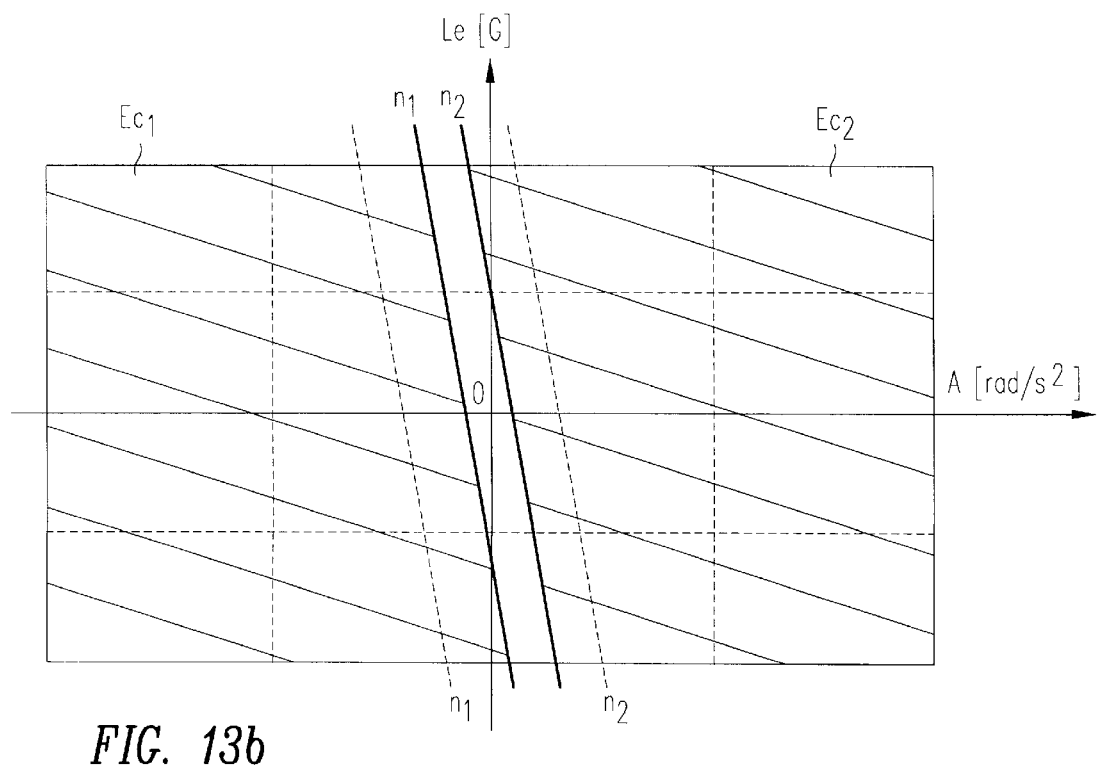

FIG. 13 is a figure showing the shock regions in which the inertial latch mechanism 7 of the present invention is operable. In FIG. 13, the shock regions in which the inertial latch mechanism 7 is operable are diagonally shaded regions Ec1 and Ec2. The shock region Ec1 in which the inertial latch mechanism 7 is operable is the left part of a straight line n1 in the total shock region Ea (refer to FIG. 9), and the shock region Ec2 in which the inertial latch mechanism 7 is operable is the right part of a straight line n2 in the total shock region Ea.

Figure 17:
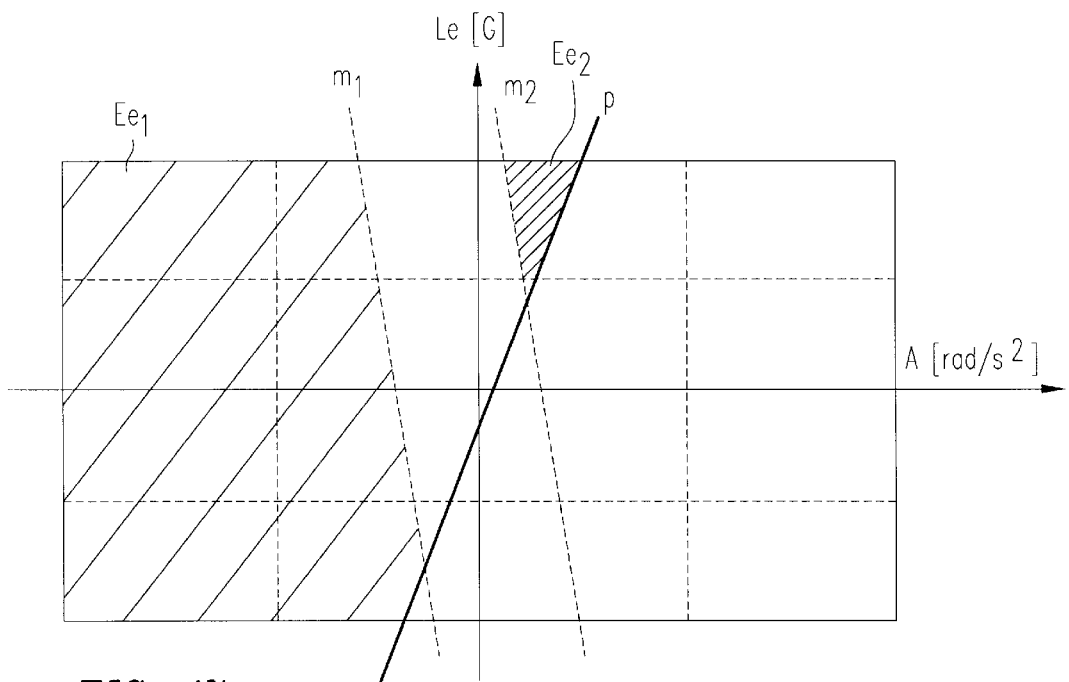
FIG. 17 is a figure showing the shock regions in which the inertial latch mechanism shown in FIG. 15 is operable.
Figure 18:
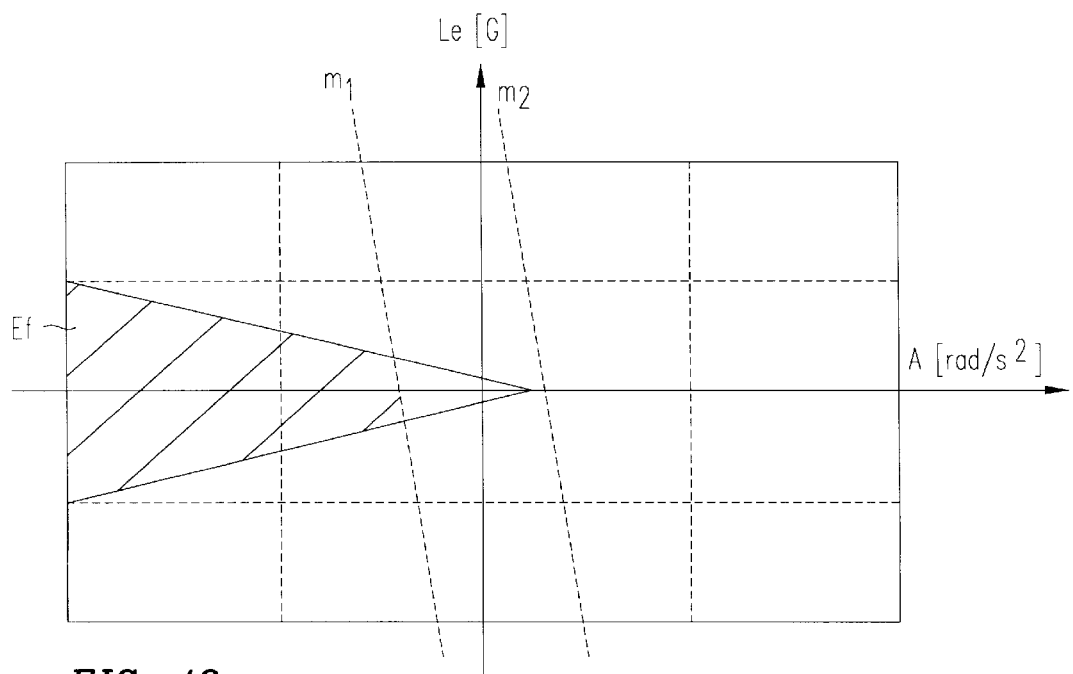
FIG. 18 is a figure showing the shock regions in which the inertial latch mechanism shown in FIG. 16 is operable.

FIG. 13 (a) shows the operable shock region when the center of mass of the inertial lever 72 exists at Gi (on the inertial arm 76 side) shown in FIG. 8, and FIG. 13 (B) shows the operable shock region when the center of mass Gi of the inertial lever 72 exists, for instance, at Gi' (on the balance arm 77 side) shown in FIG. 8. For instance, by attaching a weight to the balance arm 77, the center of mass of the inertial lever 72 can be shifted to the balance arm 77 side. In FIG. 13 (a), the straight lines n1 and n2 have positive gradients. This is because the positive effective component Le acts on the inertial lever 72 as a generally clockwise torque, and the negative effective component Le acts on the inertial lever 72 as a generally counterclockwise torque. When the angular shock acceleration A is positive, the inertial latch mechanism 7 operates more sensitively as the effective component Le of the linear shock acceleration decreases, and when the angular shock acceleration A is negative, the inertial latch mechanism 7 operates more sensitively as the effective component Le of the linear shock acceleration increases. The dead zones of the inertial latch mechanism 7 are regions Ed1 and Ed2. The dead zones Ed1 and Ed2 of the inertial latch mechanism 7 are much smaller as compared with the dead zone of the conventional inertial latch mechanism shown in FIG. 15 (refer to FIG. 17) and the dead zone of the conventional inertial latch mechanism shown in FIG. 16 (refer to FIG. 18).

By changing the position of the center of mass of the inertial lever 72, the gradients of the straight lines n1 and n2 can be changed. If the position of the center of mass of the inertial lever 72 is adjusted by the balance arm 77 or the like, the gradients of the straight lines n1 and n2 can be made negative like the straight lines m1 and m2. In FIG. 13 (b), the region sandwiched between the straight lines m1 and m2 in the total shock region Ea are all included in the region sandwiched between the straight lines m1 and m2, and thus the dead zones of the inertial latch mechanism 7 can be eliminated. To make the dead zones of the inertial latch mechanism 7 small, it is best that the direction from the pivot 21 of the actuator 22 to the center of mass of the actuator 22 is parallel with the direction from the pivot 71 of the inertial lever 72 to the center of mass of the inertial lever 72 when the actuator 22 is at the rest position. However, practically, it is enough if the gradients of the straight lines n1 and n2 have the same sign as those of the straight lines m1 and m2, as shown in FIG. 13 (b). For causing the gradients of the straight lines n1 and n2 and the gradients of the straight lines m1 and m2 to have the same sign, it is only needed that the angle between the direction from the pivot 21 to the center of mass in the actuator 22 and the direction from the pivot 72 to the center of mass in the inertial lever 72 is substantially an acute angle.

As described above, in accordance with the inertial latch mechanism 7 of the present invention, since the dead zones can be eliminated or made very little by providing the inertial lever 72 having a moment of inertia larger than that of the latch lever 74, the reliability of the inertial latch mechanism and the actuator lock mechanism can be increased. Further, since both the inertial lever 72 and the latch lever 74 can be made using a thin material such as sheet metal and they can be disposed with substantially the same height, they can be mounted even on a thin-type disk drive device. Further, the length of the inertial arm 76 of the inertial lever 72 can be set comparatively freely, and by adjusting the distances from the pivot 71 to the first latch projection 85 and the second latch projection 86, the latch sensitivity (such as the moving speed of the latch projection 84b of the latch lever 74, or the critical torque for the inertial latch mechanism 7 to operate) can be adjusted.

Further, in the actuator lock mechanism using the above inertial latch mechanism 7, the actuator hold mechanism is not limited to the ramp block 6, but a magnetic lock mechanism or the like may be used.

Furthermore, the above inertial latch mechanism 7 can also apply to the contact start stop type disk drive device in which a predetermined concentrical area on the disk 1 surface is defined as a refuge area (rest position) and the head slider 4 is caused to land on this refuge area when the device is inoperative, without providing the ramp block 6. In this case, however, an actuator hold mechanism (for instance, a magnetic lock mechanism) needs to be simultaneously used instead of the ramp block 6. In addition, the inertial latch mechanism 7 is also applicable to a removable type disk drive device as well as a disk drive device in which the disk 1 is fixed to the enclosure 10.

Figure 14:
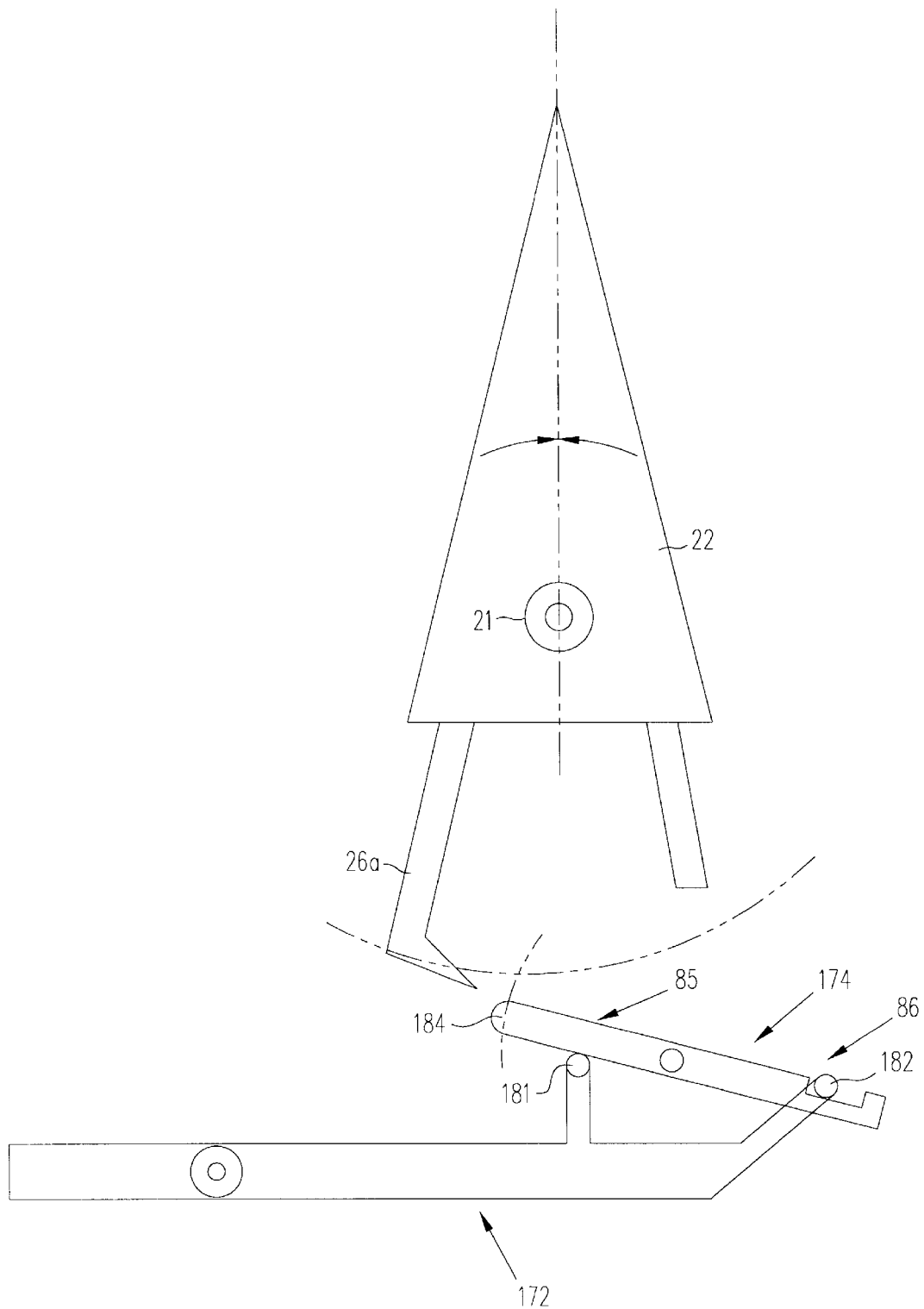
FIG. 14 is a diagrammatic view showing another inertial latch mechanism in an embodiment of the disk drive device of the present invention.

Further, in the inertial latch mechanism 7, the latch mechanism for inertial lever 72 and the latch lever 74 and the latch mechanism for the latch lever 74 and the inner arm end portion 26c of the actuator 22 are not limited to those shown in figures such as FIG. 7. Furthermore, the portion of the actuator 22 which is latched by the inertial latch mechanism 7 is not limited to the inner arm 26b, but, for instance the outer arm 26a may be latched as shown in FIG. 14. In the inertial latch mechanism shown in FIG. 14, when an inertial arm 172 rotates clockwise, a first latch projection 181 pushes a latch arm 174 at a first latch part 85 to latch an outer arm 26a with a latch projection 184, and when the inertial arm 172 rotates clockwise, the latch arm 174 is pulled by a second latch projection 182 at a second patch part 86 to latch the outer arm 26a.

As described above, in accordance with the inertial latch mechanism and the actuator latch mechanism of the present invention, since the dead zones can be eliminated or made very little by providing an inertial lever having a moment of inertia larger than the latch lever, the reliability of the inertial latch mechanism and the actuator lock mechanism can be increased. Further, since the inertial lever and the latch lever can be made using a thin material and can be disposed with substantially the same height, they can also be mounted on a thin disk drive device.

We claim:

1. An inertial latch mechanism for latching an actuator in a disk drive device at a rest position when a shock is given to said disk drive device comprising:

a latch lever rotatable on a first pivot between an actuator release position where the latch lever is not in contact with the actuator and an actuator latch position where the latch lever is in contact with the actuator; and an inertial lever rotatable on a second pivot, and having a moment of inertia about the second pivot which is larger than a moment of inertia of the latch lever about the first pivot, the inertial lever rotatable in a first direction from the actuator release position to contact the latch lever and move the latch lever to the actuator latch position and the inertial lever rotatable in a second direction from the actuator release position to contact the latch lever and move the latch lever to the actuator latch position.

2. A disk drive device comprising:

a disk recording medium;

a head slider having a head element for recording data on the disk recording medium and reading the recorded data;

an actuator having a head arm on which the head slider is mounted, for unloading the head arm to the rest position, and loading the head arm from the rest position so that the head slider is close to a surface of the disk recording medium; and an inertial latch mechanism as set forth in claim 1.

3. An inertial latch mechanism for latching an actuator in a disk drive device at a rest position when a shock is given to said disk drive device comprising:

a latch lever rotatable on a first pivot between an actuator release position where the latch lever is not in contact with the actuator and an actuator latch position where the latch lever is in contact with the actuator; and an inertial lever rotatable on a second pivot, and having a moment of inertia about the second pivot which is larger than a moment of inertia of the latch lever about the first pivot, the inertial lever rotatable in a first direction from the actuator release position to contact the latch lever and move the latch lever to the actuator latch position and the inertial lever rotatable in a second direction from the actuator release position to contact the latch lever and move the latch lever to the actuator latch position;

a bias unit for positioning the latch lever at the actuator release position when the latch lever does not receive a torque from the inertial lever.

* * * * *